United States Patent
Shiraishi et al.

(10) Patent No.: US 6,796,660 B2
(45) Date of Patent: Sep. 28, 2004

(54) DISPLAY OPTICAL UNIT AND DISPLAY APPARATUS USING THIS UNIT

(75) Inventors: Mikio Shiraishi, Yokohama (JP); Nobuyuki Kaku, Naka-gun (JP); Fukuyasu Abe, Yokohama (JP); Kenji Fuse, Yokosuka (JP); Nobuo Masuoka, Chigasaki (JP); Tatsuo Morita, Meguro-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/615,906

(22) Filed: Jul. 10, 2003

(65) Prior Publication Data

US 2004/0008325 A1 Jan. 15, 2004

Related U.S. Application Data

(63) Continuation of application No. 10/028,424, filed on Dec. 28, 2001, now Pat. No. 6,595,645, which is a continuation of application No. 09/392,563, filed on Sep. 9, 1999, now Pat. No. 6,334,686.

(30) Foreign Application Priority Data

Feb. 10, 1999 (JP) ............................................. 11-032363

(51) Int. Cl.$^7$ ........................ G03B 21/26; G03B 21/14; G03B 21/18; G03B 21/22
(52) U.S. Cl. .............................. 353/57; 353/60; 353/61; 353/119
(58) Field of Search .............................. 353/30, 31, 52, 353/57, 58, 60, 61, 100, 101, 119; 355/30

(56) References Cited

U.S. PATENT DOCUMENTS

| | | | |
|---|---|---|---|
| 5,676,442 A | | 10/1997 | Fujimori ..................... 353/119 |
| 5,895,110 A | | 4/1999 | Okada et al. .................. 353/31 |
| 6,280,038 B1 | * | 8/2001 | Fuse et al. ..................... 353/57 |
| 6,334,686 B1 | * | 1/2002 | Shiraishi et al. .............. 353/57 |
| 6,443,575 B1 | * | 9/2002 | Miyamoto et al. ............. 353/58 |
| 2002/0075457 A1 | * | 6/2002 | Wang et al. ................... 353/61 |
| 2003/0206276 A1 | * | 11/2003 | Konuma et al. ............... 353/31 |

* cited by examiner

Primary Examiner—Russell Adams
Assistant Examiner—Melissa Koval
(74) Attorney, Agent, or Firm—Antonelli, Terry, Stout & Kraus, LLP

(57) ABSTRACT

A projective display apparatus having an illumination unit which includes a light source, an integrator lens and a collimator lens, a light splitter unit which splits light beams from the illumination unit into a plurality of color components, a plurality of light valves, a cooling fan, and a wind guiding unit. A respective one of the light valves corresponds to a respective one of the color components. The wind guiding unit guides the cooling wind from the cooling fan to the illumination unit and the light valves. The wind guiding unit splits and forms at least two branch wind guiding paths. One of the branch wind guiding paths guides cooling wind from the cooling fan to the illumination unit and another of the branch wind guiding paths guides the cooling wind to the light valves.

4 Claims, 15 Drawing Sheets

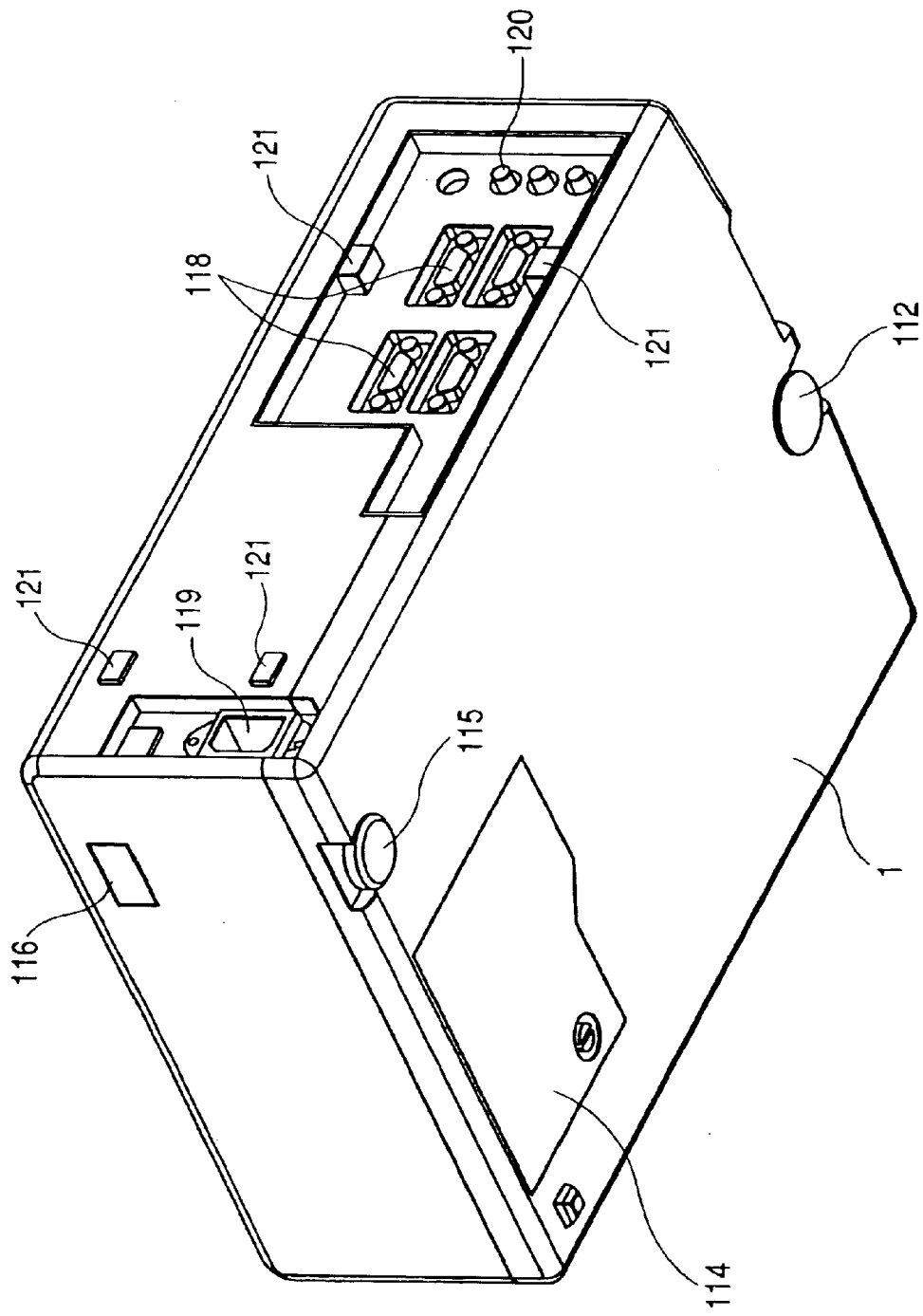

DISPLAY OPTICAL UNIT AND DISPLAY APPARATUS USING THIS UNIT

CROSS REFERENCE TO RELATED APPLICATION

This is a continuation of U.S. application Ser. No. 10/028,424, filed Dec. 28, 2001, now U.S. Pat. No. 6,595,645, which is a continuation of Ser. No. 09/392,563, filed Sep. 9, 1999, now U.S. Pat. No. 6,334,686, the subject matter of which is incorporated by reference herein.

BACKGROUND OF THE INVENTION

The present invention relates to a display-apparatus technology used for projecting a picture on a screen by using a light valve device such as a liquid-crystal display panel and adopted in equipment such as a liquid-crystal projector apparatus, a liquid-crystal television and a projective display apparatus.

There have been provided conventional display apparatuses such as a liquid-crystal projector for projecting a picture on a screen or the like in an enlarged size by conversion of a light emitted by a light source such as a lamp into concentrations of pixels and adjustment of the concentrations using a light valve device such as a liquid-crystal display panel.

The light valve device generally comprises a semiconductor driving device and an optically functioning material. In order to have the semiconductor driving device and the optically functioning material operate normally, it is necessary to keep them at a predetermined temperature, for example the temperature is about 60 degrees Celsius or lower.

On the other hand, all the light emitted by the light source except that eventually used for projection is absorbed by elements such as the light valve device and its peripheral optical devices, being converted thereby into heat energy. For this reason, it is necessary to cool the light valve device employed in the projective display apparatus so as to prevent the temperature of the light valve device from exceeding a range of the normal operation due to overheating. The need for such cooling is rising more and more as the intensity of the light source is increased in recent years to raise the luminance of the projected picture. This is because the amount of heat dissipated by the light valve device increases as the intensity of the light source is raised.

The performances and functions of some optically functioning components other than the light valve device and some of those made of a polymer material change at a high temperature. It is thus necessary to keep them at a predetermined temperature, for example the temperature is about 150 degrees Celsius or lower. That is, it is necessary to cool the optically functioning components other than the light valve device as the luminance of the projected picture is increased.

In addition, since the focus of an optical system employed in such a display apparatus is positioned on the picture surface of the light valve device, a foreign particle such as dust stuck to the light valve device or areas in close proximity thereto is projected on the screen as it is in an enlarged size as a shadow appearing on the screen. In consequence, there are raised serious problems of prevention of dust from being stuck to the light valve device or areas in close proximity thereto and maintainability including removal of stuck dust as a matter of course.

There is a typical conventional technology of cooling a light valve device which is disclosed in Japanese Patent Laid-open No. Hei 9-120046. According to this technology which is relevant to the present invention, a wind is blown to a side surface of a liquid-crystal light valve to cool the heated liquid-crystal light valve. In this way, an increase in temperature caused by heat dissipated by the liquid-crystal light valve device(liquid-crystal display panel)can be suppressed by the cooling. According to this relevant technology, since a wind is blown from one side only, however, the temperature on the entrance side of the cooling wind decreases while the temperature on the exit side increases, resulting in a difference in temperature which makes it impossible to obtain a sufficient performance particularly at a high luminance. In this respect, this conventional technology does not adequately address the problem. In addition, this conventional technology also does not address a lack of cooling power as evidenced by the fact that the total amount of heat dissipated by the light valve device is raised with an increase in luminance. Furthermore, this conventional technology also does not address the necessity to cool optically functioning components other than the light valve device as the luminance is increased.

There is another relevant technology of cooling a light valve device which is disclosed in Japanese Patent Laid-open No. Hei 5-53200. According to this relevant technology, a sirocco fan of a pressure centrifugal type is used for cooling a light valve means. By doing so, a sufficient wind blowing capacity can be assured by using even a duct with a relatively small diameter, allowing the cooling to be carried out with a high degree of efficiency. Nevertheless, this conventional technology also does not address the necessity to cool optically functioning components other than the light valve device as the luminance is increased.

There is also a relevant technology of preventing dust from being stuck in a picture display apparatus as is disclosed in Japanese Patent Laid-open No. Hei 7-152009. According to this relevant technology, a transmission light valve device serving as a liquid-crystal display panel is placed in a hermetically sealed space. An air is circulated in the hermetically sealed space to let the liquid-crystal display panel radiate heat dissipated thereby to the outside of the space. In this way, it is possible to prevent dust from being stuck to the liquid-crystal display panel. In some cases, however, the cooling power becomes insufficient as heat is dissipated as a result of increasing the luminance. In addition, dust introduced during a fabrication process may be inadvertently included in the hermetically sealed space. Thus, this relevant technology also does not address a problem of maintainability caused by, among other things, the difficulty to remove such dust.

With respect to the maintainability of a picture display apparatus, there is a relevant technology disclosed in Japanese Patent Laid-open No. Hei 7-311372. According to this relevant technology, the interior of the picture display apparatus comprises a combination of units which can be attached and detached individually. With such a configuration, each of the units can be maintained and replaced with ease. According to this relevant technology, however, a unit including a liquid-crystal light valve device and a projection lens requiring frequent maintenance checks has a configuration which allows this specific unit to be attached and detached only in the projection direction of the projection lens. It is thus necessary to disassemble units of the whole optical system in order to attach or detach the specific unit.

In the case of the technologies disclosed in Japanese Patent Laid-open Nos. Hei 9-120046 and Hei 5-53200, the cooling of the light valve device and the disposition of dust stuck to the light valve device and areas in close proximity thereto are required as the luminance is increased. Otherwise, problems such as an abnormal operation caused by overheating and a shadow appearing on the screen due to the stuck dust as described above will likely arise. However, the relevant technologies do not address these problems and, of course, do not take solutions to the problems into consideration. In addition, these relevant technologies do not address the necessity to cool optically functioning devices at the same time either.

In the case of the technology disclosed in Japanese Patent Laid-open No. Hei 7-152009, cooling is done by an air circulated in a hermetically sealed space. Thus, efficient cooling can not be much expected. As a result, it is quite within the bounds of possibility that the light valve device can not be cooled sufficiently in the event of an increased amount of dissipated heat due to an increased intensity of the light emitted by the light source. In this case, in spite of the fact that the picture display apparatus will no longer operate normally, the relevant technology does not address the problem and, of course, does not take a solution to the problem into consideration. The relevant technology also does not address a problem related to the maintenance of the picture display apparatus, and, of course, does not take a solution to the problem into consideration.

In the case of the technology disclosed in Japanese Patent Laid-open No. Hei 7-311372, workability during maintenance is not taken into consideration adequately as evidenced by, among other things, the fact that it is necessary to disassemble peripheral members of the light valve device during maintenance work of the device or components in close proximity thereto.

SUMMARY OF THE INVENTION

It is thus an object of the present invention addressing the problems described above to provide a display apparatus technology that is capable of cooling a light valve means and other optically functioning components with a high degree of efficiency and offers excellent maintainability of peripheral components surrounding the light valve device.

In order to achieve the object described above, the picture display apparatus provide by the present invention can have one of the following configurations:

1 In a display optical unit for a display apparatus for displaying a picture by splitting a light emitted by an illumination means into a plurality of color components using a splitting means, modulating each of said color components using a light valve means and guiding modulated color components to a projection means, an optical axis of said projection means is shifted from an optical axis of said illumination means and said splitting means, and said projection means can be attached and detached in a direction in which said optical axes are shifted from each other.

2 In a display optical unit for a display apparatus for displaying a picture by modulating a light emitted by an illumination means using a light valve means and guiding a modulated light to a projection means, said light valve means is cooled by cooling winds blown by a cooling means to said light valve means through a plurality of wind supply openings in directions within the range 45 degrees to 315 degrees.

3 In a display optical unit for a display apparatus for displaying a picture by modulating a light emanating from an illumination means and passing through a polarization means using a light valve means and guiding a modulated light to a projection means, said polarization means is cooled by cooling winds blown by a cooling means to said polarization means through a plurality of wind supply openings in directions within the range 45 degrees to 315 degrees.

4 In a display optical unit for a display apparatus for displaying a picture by modulating a light emitted by an illumination means using a light valve means and guiding a modulated light to a projection means, said light valve means is cooled by a cooling means including a wind generating means for blowing a cooling wind and a wind guiding path for splitting said cooling wind and for supplying a split cooling wind to a plurality of optical means including at least said light valve means.

5 In a display optical unit for a display apparatus for displaying a picture by modulating a light emitted by an illumination means using a light valve means and guiding a modulated light to a projection means, said light valve means is cooled by cooling winds blown by a cooling means to a light incidence surface and a light emission surface of said light valve means in directions within the range 45 degrees to 315 degrees.

6 In a display optical unit for a display apparatus for displaying a picture by modulating a light emanating from an illumination means and passing through a polarization means using a light valve means and guiding a modulated light to a projection means, said polarization means is cooled by cooling winds blown by a cooling means to a light incidence surface and a light emission surface of said polarization means in directions within the range 45 degrees to 315 degrees.

7 In a display apparatus for displaying a picture by splitting a light emitted by an illumination means into a plurality of color components using a splitting means, modulating each of said color components using a light valve means and guiding modulated color components to a projection means, an optical axis of said projection means is shifted from an optical axis of said illumination means and said splitting means, and said projection means can be attached and detached in a direction in which said optical axes are shifted from each other.

8 In a display apparatus for displaying a picture by modulating a light emitted by an illumination means using a light valve means and guiding a modulated light to a projection means, said light valve means is cooled by cooling winds blown by a cooling means to said light valve means through a plurality of wind supply openings in directions within the range 45 degrees to 315 degrees.

9 In a display apparatus for displaying a picture by modulating a light emanating from an illumination means and passing through a polarization means using a light valve means and guiding a modulated light to a projection means, said polarization means is cooled by cooling winds blown by a cooling means to said polarization means through a plurality of wind supply openings in directions within the range 45 degrees to 315 degrees.

10 In a display optical unit for a display apparatus for displaying a picture by modulating a light emitted by an illumination means using a light valve means and guiding a modulated light to a projection means, said light valve means is cooled by a cooling means including a wind generating means for blowing a cooling wind and a wind guiding path for splitting said cooling wind and for supplying a split cooling wind to a plurality of optical means including at least said light valve means.

11 In a display apparatus for displaying a picture by modulating a light emitted by an illumination means using a light valve means and guiding a modulated light to a projection means, said light valve means is cooled by cooling winds blown by a cooling means to a light incidence surface and a light emission surface of said light valve means in directions within the range 45 degrees to 315 degrees.

12 In a display apparatus for displaying a picture by modulating a light emanating from an illumination means and passing through a polarization means using a light valve means and guiding a modulated light to a projection means, said polarization means is cooled by cooling winds blown by a cooling means to a light incidence surface and a light emission surface of said polarization means in directions within the range 45 degrees to 315 degrees.

BRIEF DESCRIPTION OF THE DRAWINGS

FIG. 3 is a diagram showing a squint view of the bottom of the external appearance of the picture display apparatus implemented by the first embodiment of the present invention;

DETAILED DESCRIPTION OF THE PREFERRED EMBODIMENTS

Some preferred embodiments of the present invention are described by referring to accompanying diagrams as follows.

FIGS. 1 to 12 are explanatory diagrams referred to in an explanation of a first embodiment of the present invention.

Figure 1:
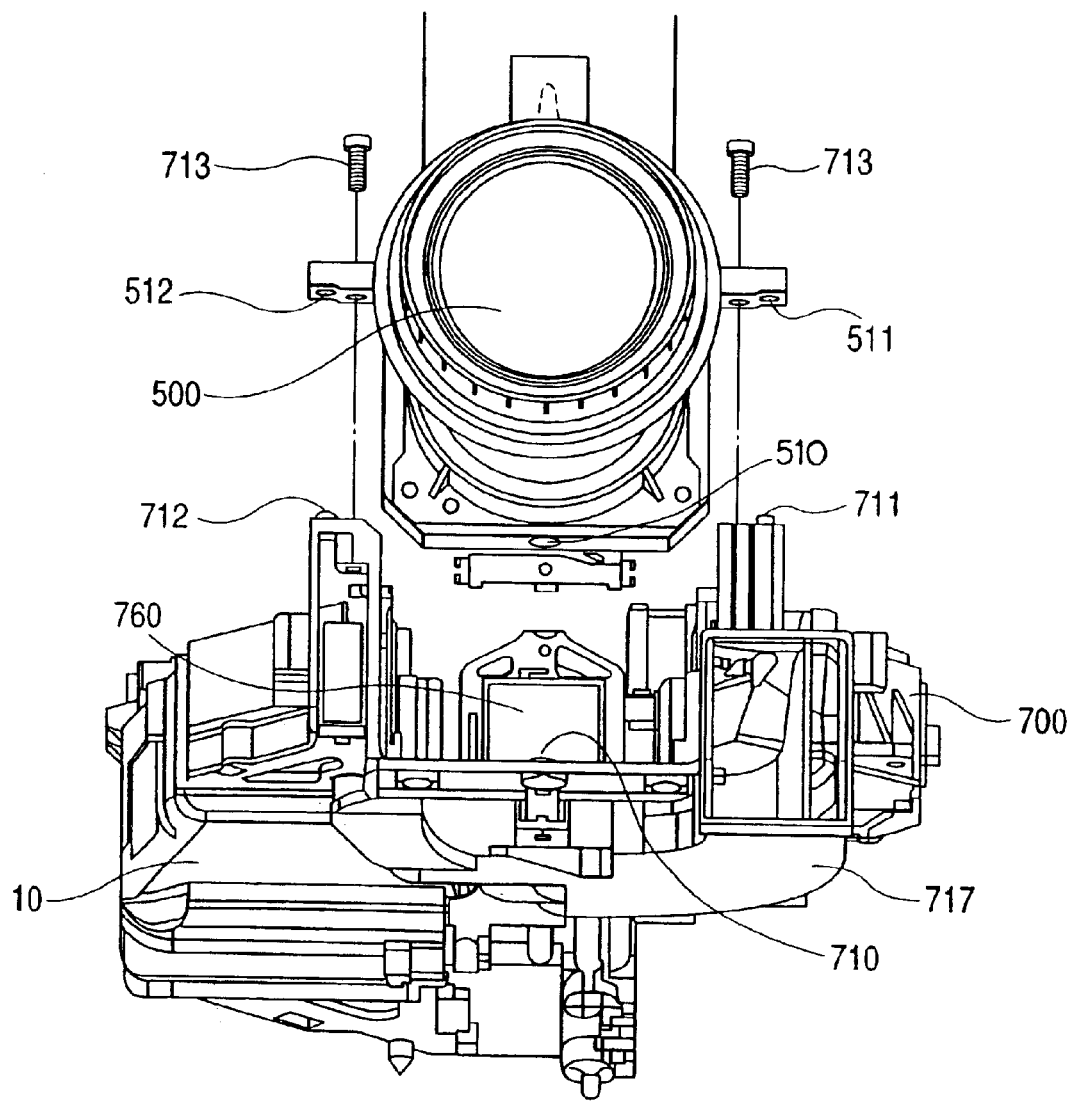
FIG. 1 is an explanatory diagram used for describing a detachment/attachment technology adopted in a display apparatus implemented by a first embodiment of the present invention.

In a picture display apparatus shown in FIG. 1, a projection unit 500 can be attached to and detached from a lower-side unit case 700 of an optical unit 10. The projection unit 500 is attached or detached in an upward direction with respect to the projection direction of a projection lens employed in the picture display apparatus shown in FIG. 1.

Before getting into a detailed description, the configuration of the picture display apparatus implemented by this embodiment is explained in a simple and plain manner by referring to FIGS. 2 to 8.

Figure 2:
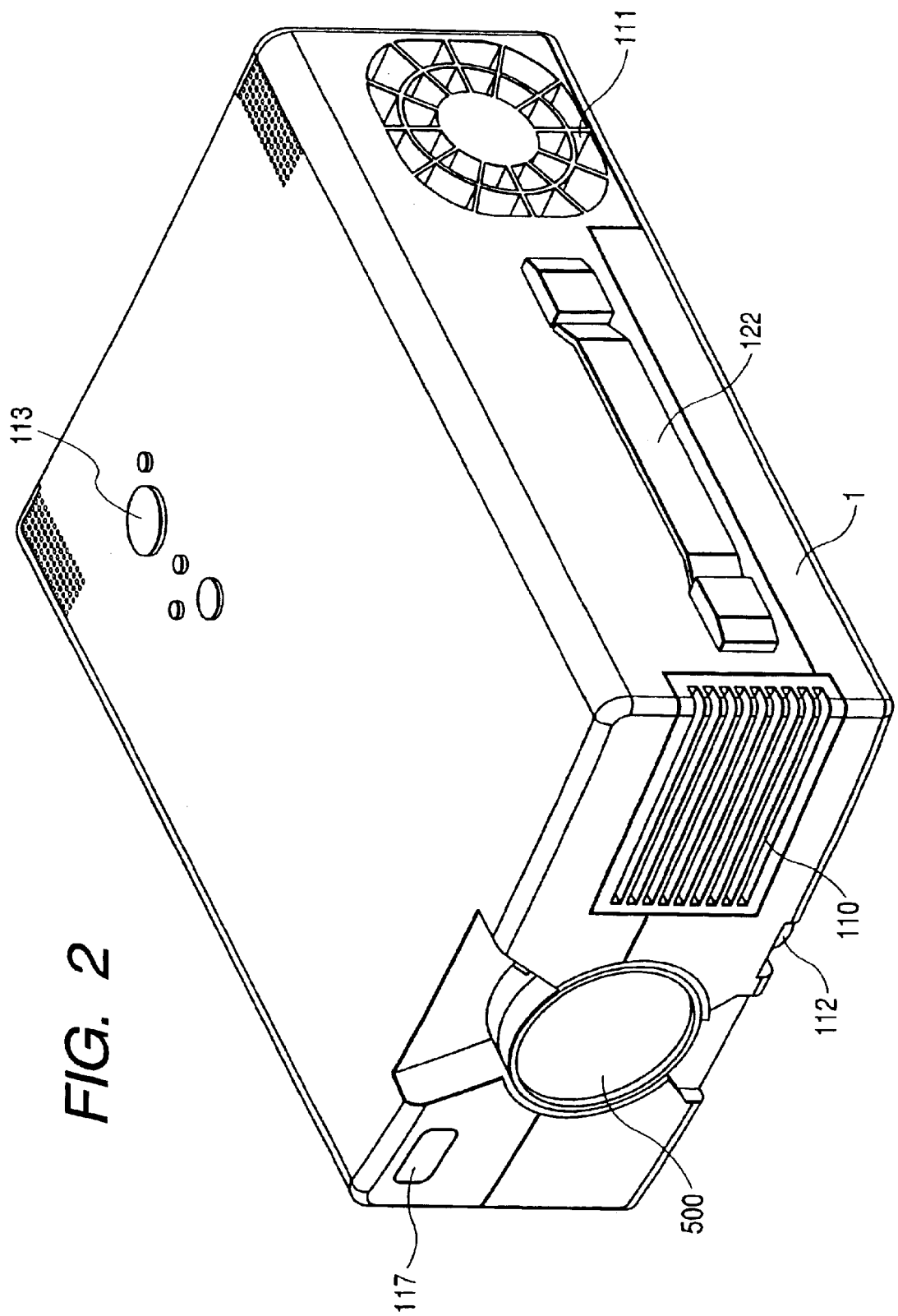
FIG. 2 is a diagram showing an external appearance of the picture display apparatus implemented by the first embodiment of the present invention.

FIG. 2 is a diagram showing an external appearance of the picture-display apparatus implemented by the embodiment of the present invention. An optical unit 10 is accommodated in the picture display apparatus 1. In the picture display apparatus 1, a projection-lens means, which is a portion of the projection unit 500, is exposed to the outside of an external cabinet of the picture display apparatus 1. The projection-lens means projects a picture on an external screen or the like. An inlet port 110 and an exhaust port 111 are provided on the front surface and on the rear side of a side surface of the picture display apparatus 1 respectively. An air is introduced from the atmosphere outside the picture display apparatus 1 through the inlet port 110 to cool the interior of the apparatus 1. The air becoming warmed during the cooling is then exhausted to the outside of the picture display apparatus 1 through the exhaust port 111.

The picture display apparatus 1 is operated by the user who operates an operation button 113, or by an operation signal provided by an external source to the apparatus 1 through a first remote-operation receiving unit 117. The picture display apparatus 1 is carried by the user by grabbing a handle 122.

FIG. 3 is a diagram showing a squint view of the bottom of the external appearance of the picture display apparatus 1 shown in FIG. 2.

On the bottom of the picture display apparatus 1, there is provided a replacement cover 114 to be opened to allow a light source to be accessed for replacement by another. In addition, there are also provided a first adjustment foot 112 and a second adjustment foot 115 for adjusting the installation angle of the picture display apparatus 1 as a whole in order to adjust a projection angle of a projected picture. To put it in detail, the heights of the first and second adjustment feet 112 and 115 are adjusted in order to finely adjust the position and the gradient of the projected picture.

Picture signals generated by external sources are supplied to the picture display apparatus 1 through a first input terminal 118 and a second input terminal 120. Power is supplied to the picture display apparatus 1 through a power supply connector 119. A second remote-operation receiving unit 116 provided on the rear surface of the picture display apparatus 1 has the same function as the first remote-operation receiving unit 117 shown in FIG. 2.

On the side surface opposite to the handle 122 shown in FIG. 2, there are provided foots 121 each having a height bigger than those of the input terminals 118 and 120 so that, when the user carrying the picture display apparatus 1 by grabbing the handle 122 puts the apparatus 1 on a floor, the terminals 118 and 120 and other components provided on the same surface are not injured.

Figure 4A:
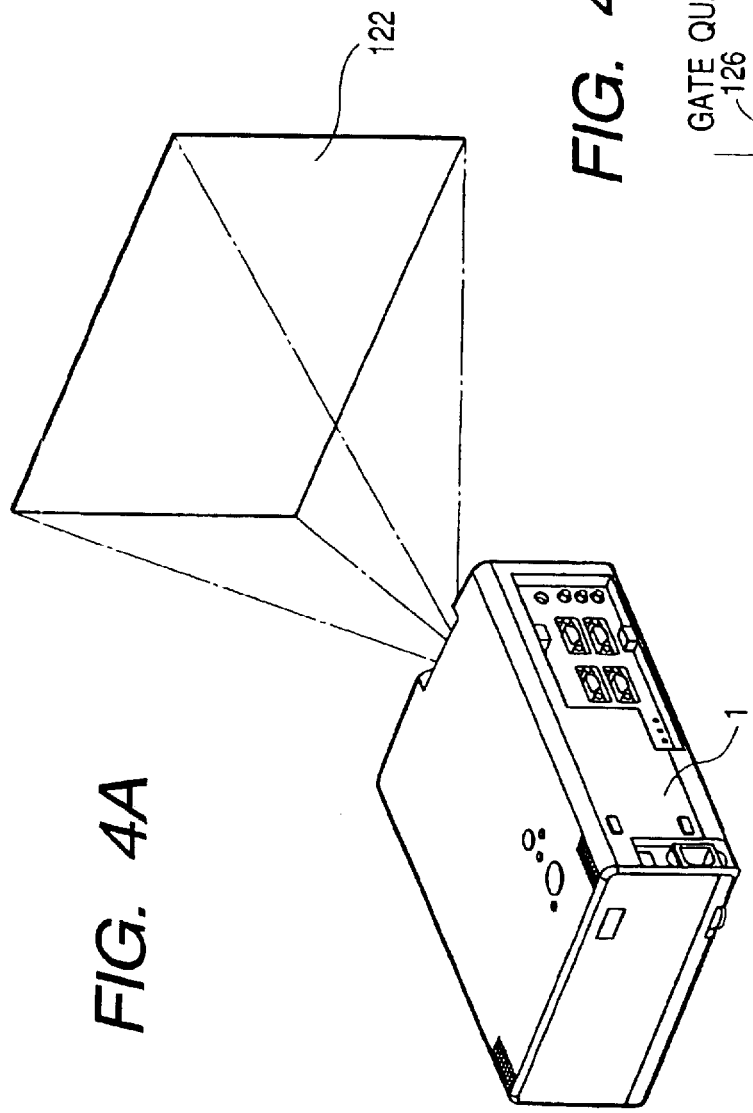
FIG. 4 is a cross-sectional diagram showing the position of a picture projected by the picture display apparatus implemented by the first embodiment of the present invention.
Figure 4B:
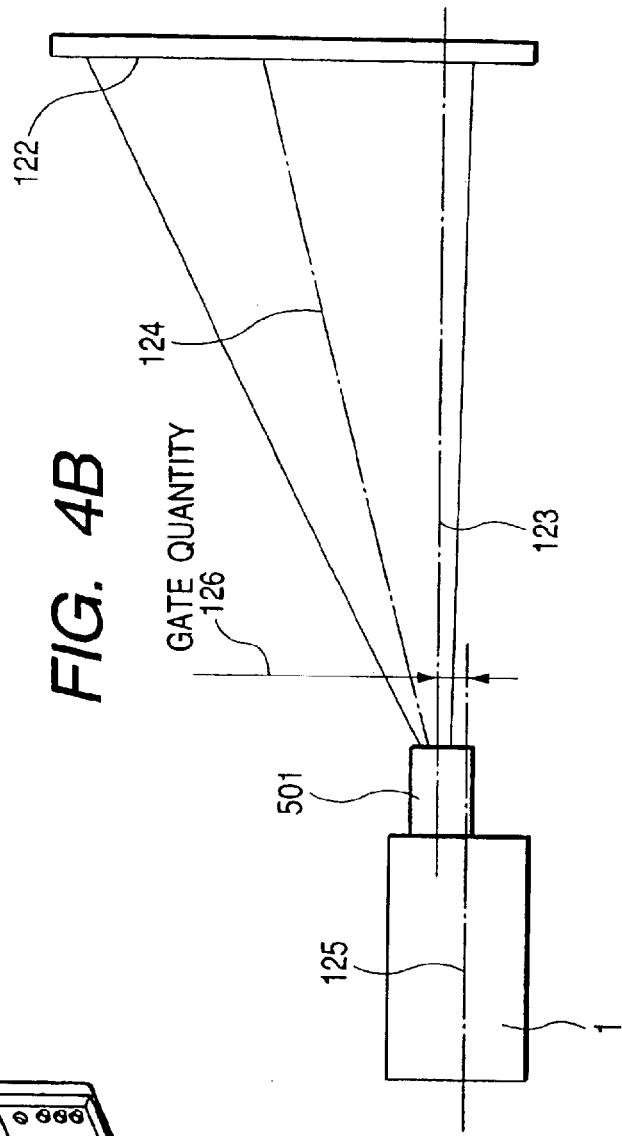

FIGS. 4A and 4B are diagrams showing respectively a squint view and a side view of an operating state of the picture display apparatus 1 shown in FIG. 1. As shown in the figures, beams radiated by the picture display apparatus 1 are projected on a screen as a picture 122. As shown in FIG. 4B, the picture display apparatus 1 projects the picture 122 at such a position on the screen that an optical axis 124 of the projected beams is oriented upward with respect to an optical axis 123 of the projection unit, forming the so-called gate quantity(or gate angle) 126 on an optical axis 125 of the projection lens. The gate quantity 126 formed on the optical axis 125 of the projection lens avoids keystone distortion (or trapezoidal distortion) which is generated when a picture is projected on a higher screen with the picture display apparatus 1 placed on a flat base such as a desk. To put it in detail, by placing the projection lens at such a location that the optical axis 125 of the projection lens is set at a predetermined displacement from the optical axis 123, a picture projected in a slanting direction will have a shape with no rectangular distortion or the like. The predetermined displacement is referred to hereafter as a gate quantity 126.

To be more specific, a displacement of a predetermined optical axis set in advance is referred to as a gate and the magnitude of the gate is known as a gate quantity 126. A gate quantity 126 is provided in the upward direction as shown in FIG. 4B.

When the picture display apparatus 1 is suspended from a ceiling, the apparatus 1 is turned upside down when compared with the installation posture shown in FIG. 4. In this case, a picture can be projected on a screen beneath the ceiling with the optical axis 124 of the projected beams oriented downward with respect to the ceiling.

Figure 5:
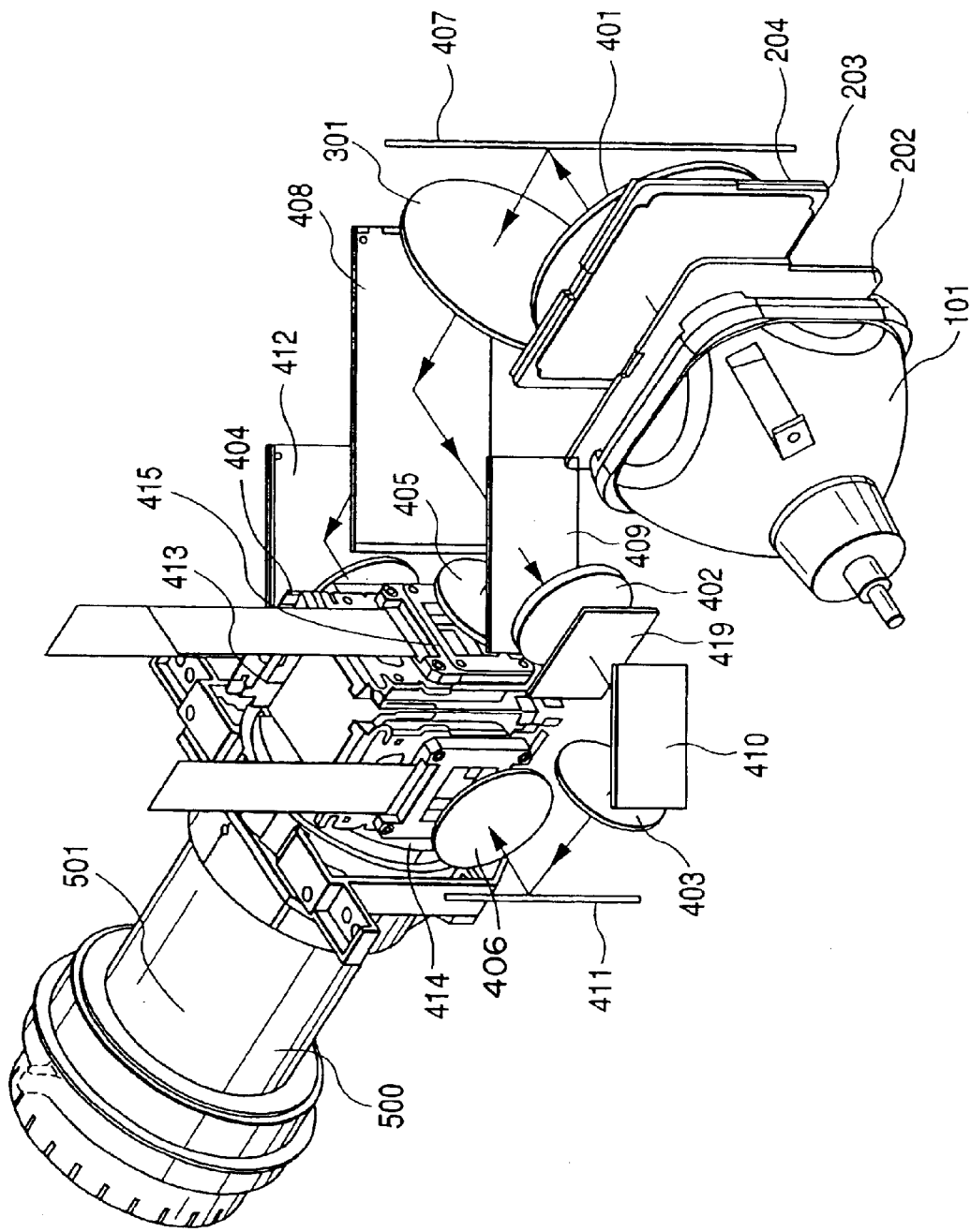
FIG. 5 is a diagram showing a squint view of the configuration of an optical unit employed in the picture display apparatus implemented by the first embodiment of the present invention.

FIG. 5 is a diagram showing an optical configuration inside the picture display apparatus shown in FIG. 1.

As shown in the figure, a beam emitted by the light source 101 at a proper quantity of light first of all passes through a first integrator lens 202, a second integration lens 203 and a first collimator lens 401 before being reflected by a first reflection mirror 407. The reflected beam then passes through a second collimator lens 301, being guided to a second dichroic mirror 408. In the second dichroic mirror 408, the beam is split into 2 components with different colors which are typically red and cyan. The red component passes through the second dichroic mirror 408, traveling to a fourth reflection mirror 412 while the cyan component is reflected to a third dichroic mirror 409. In the third dichroic mirror 409, the incident cyan component is further split into 2 components with different colors which are typically green and blue. The blue component passes through the third dichroic mirror 409, traveling to an first relay lens 402 while the green component is reflected to a G (green) condenser lens 405. In this way, the beam is split into a plurality of color components required for expressing a color picture.

The beam components with different colors travel to light valve means dedicated to the different colors. To be more specific, the red beam component reflected by the fourth reflection mirror 412 travels to an R light valve device 413 by way of an R (red) condenser lens 404. The green beam component incident to the G condenser lens 405 goes to a G light valve device 415. The blue beam component incident to the first relay lens 402 goes to a B (blue) light valve device 414 by way of a filter 419, a fourth reflection mirror 410, a B relay lens 403, an sixth reflection mirror 411 and a B condenser lens 406. Driven by a driving circuit means not shown in the figure, each of the light valve means for the different color components displays an image so that the beams of the different color components incident to the light valve means are modulated in the means according to the images before traveling to the projection unit 500. The projection unit 500 employs a prism serving as a synthesis means for synthesizing a plurality of color components. Eventually, the modulated beams are radiated to the outside of the picture display apparatus 1 by a projection lens 501.

As a result, the images displayed on the light valve devices 413, 414 and 415 for the different colors are projected on a screen not shown in the figure as a picture with an enlarged size.

As explained earlier by referring to FIG. 4, a gate quantity is set by, among others, shifting the optical axis of the prism and the optical axis of the projection lens 501 employed in the projection unit 500. Thus, a beam obtained as a result of a synthesis in the prism is projected in a direction shifted by an angle corresponding to the gate quantity set by the projection lens 501.

Figure 6:
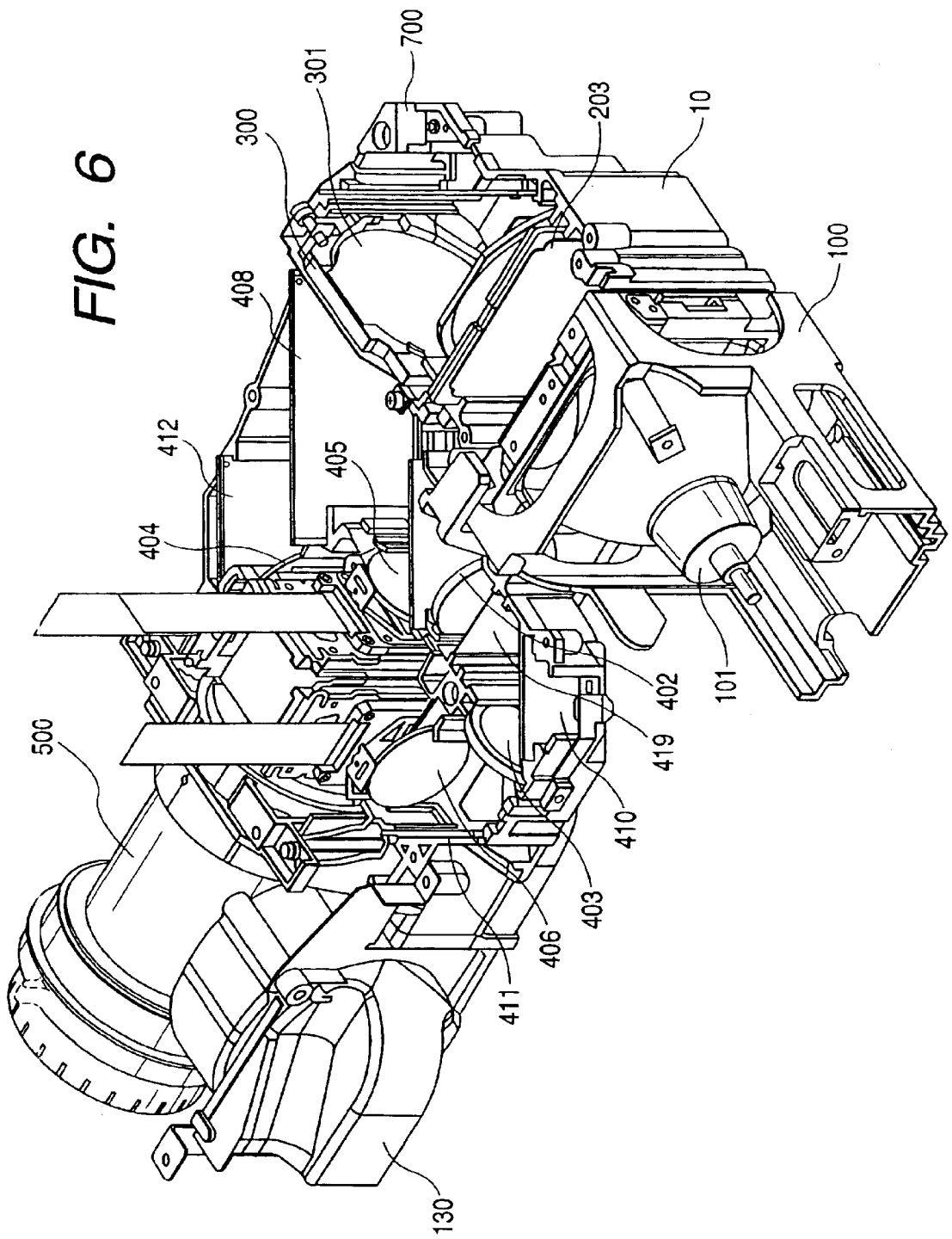
FIG. 6 is a diagram showing a squint view of the configuration of the picture display apparatus implemented by the first embodiment of the present invention.

FIG. 6 is a diagram showing the configuration of an optical system 10 inside the picture display apparatus shown in FIG. 1. FIG. 5 shows a layout of optical components of the optical system 10 which are supported by a lower-side unit case 700 of the optical system 10.

The light source 101 is installed on the optical unit 10, being supported by a light-source unit 100. The light-source unit 100 needs to be replaced when necessary in dependence on conditions of its usage. For this reason, the light-source unit 100 can be attached to and detached from the optical unit 10.

A centrifugal cooling means 130 introduces an air from the atmosphere outside the picture display apparatus and blows a wind to members which are required to be cooled. Examples of the members that need to be cooled are the light valve means in the optical unit 10.

The projection unit 500 is installed on the lower-side unit case 700 constituting a lower-side portion of the optical unit 10. That is, the projection unit 500 is installed on the lower-side unit case 700 which supports the optical components as described above.

Figure 7:
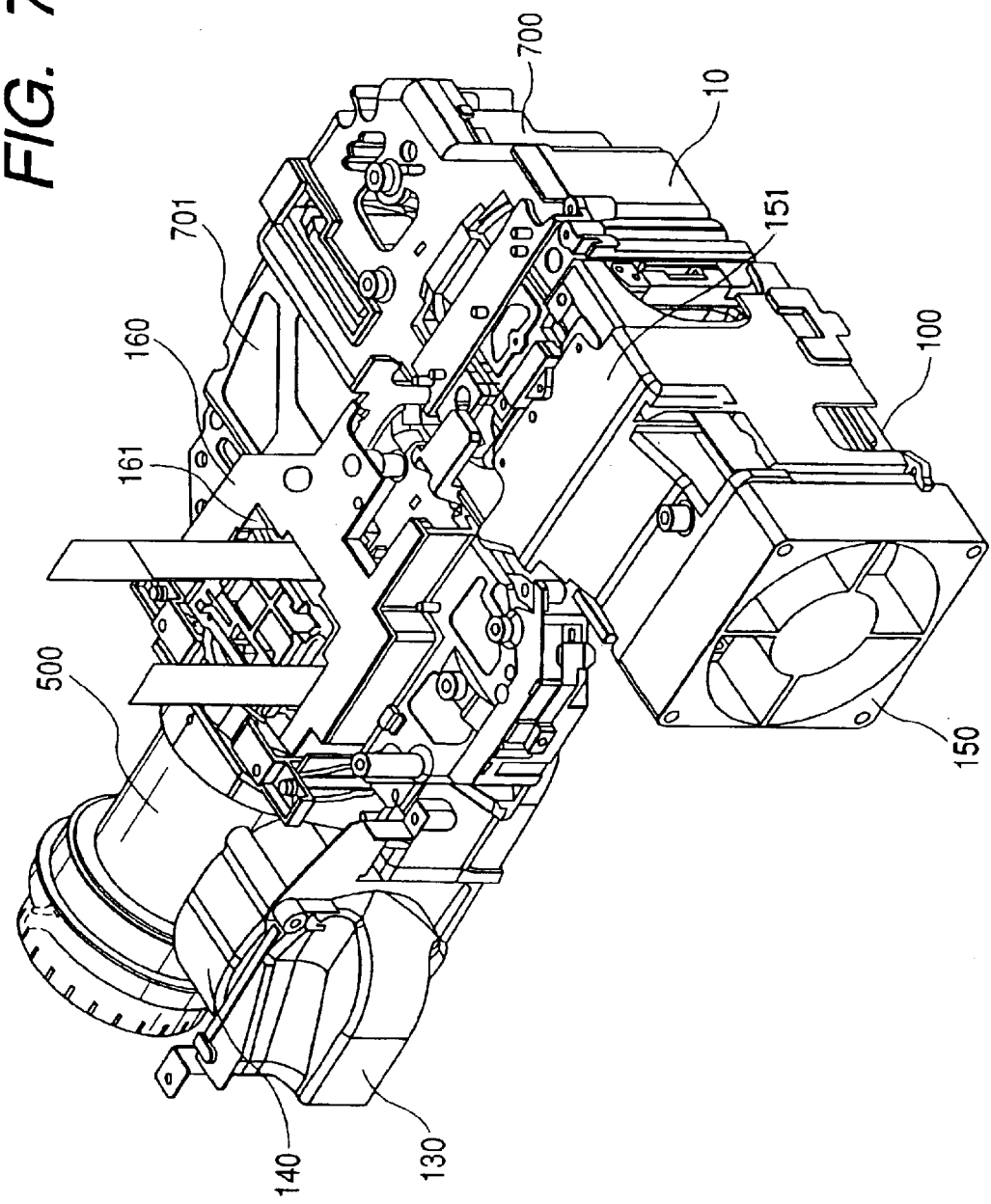
FIG. 7 is a diagram showing a squint view of the configuration of the picture display apparatus implemented by the first embodiment of the present invention.

FIG. 7 is a diagram showing an upper-side unit case 701 installed on the lower-side unit case 700 in the configuration of the optical unit 10 explained earlier by referring to FIG. 6.

On the upper-side unit case 701, there are installed a first cover 160 and a second cover 161 above the light valve means.

A light-source housing 151 is installed above the light-source unit 100 and an axial fan 150 is further provided on the light-source housing 151. The axial fan 150 is used mainly for cooling the light-source unit 100 and components in close proximity thereto.

Figure 8:
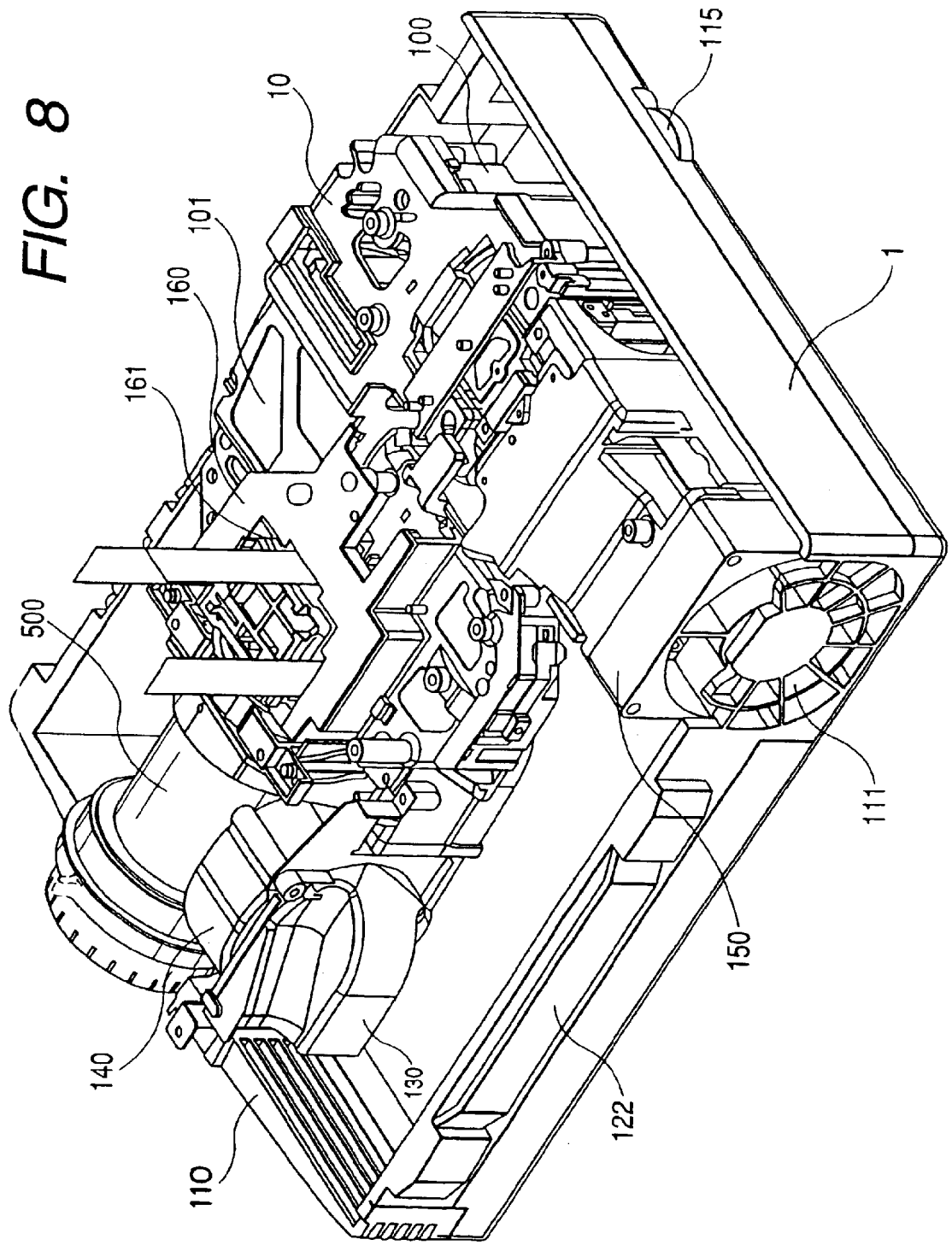
FIG. 8 is a diagram showing a squint view of the internal configuration of the picture display apparatus implemented by the first embodiment of the present invention.

FIG. 8 is a diagram showing a state in which the optical unit 10 is accommodated in an external cabinet. For explanation purposes, the figure shows the external cabinet with the upper portion thereof removed.

In the optical unit 10 accommodated in the external cabinet of the picture display apparatus 1, an air introduced from the atmosphere outside the apparatus 1 by way of the inlet port 110 is supplied to a centrifugal cooling means 130 for cooling mainly components in the optical unit 10. After cooling the components, the air is exhausted to the inside of the external cabinet. On the other hand, the axial fan 150 facing the exhaust port 111 exhausts the air warmed after being used for cooling the light-source unit 100 and the components in close proximity thereto to the outside of the picture display apparatus 1. At that time, the air flowing to spaces in close proximity to the light-source unit 100 is the air inside the external cabinet which includes the air used for cooling the components in the optical unit 10 described above. In addition, the axial fan 150 also exhaust all the air used for cooling electrical circuit components such as a power supply and a signal processing circuit, which are not shown in the figure, to the outside of the picture display apparatus 1.

The cooling temperature of the light source 101 employed in the light-source unit 100 is typically 600 degrees Celsius which is much higher than a typical cooling temperature of 50 degrees Celsius for the optical unit 10 and the power supply not shown in the figure. Thus, the air with a temperature thereof increased from an atmospheric temperature of typically 20 degrees Celsius to about 25 degrees Celsius after being used once for cooling the optical unit 10 and the power supply can be still used for cooling the light source 101 without causing a problem.

In this way, the whole picture display apparatus 1 is cooled.

The description is continued by referring back to FIG. 1.

As described above, the projection unit 500 can be attached to and detached from the lower-side unit case 700. The position of the projection unit 500 on the lower-side unit case 700 is fixed by putting a positioning hole 510, a first positioning hole 511 and a second positioning hole 512 provided on the projection unit 500 in a state of being engaged respectively with 3 protrusions provided on the lower-side unit case 700, namely, a first positioning protrusion 710, a second positioning protrusion 711 and a third positioning protrusion 712. To be more specific, first of all, the positioning hole 510 provided on the projection unit 500 is put in a state of being engaged with the first positioning protrusion 710 provided on the lower-side unit case 700. Then, the first positioning hole 511 provided on the projection unit 500 is put in a state of being engaged with the second positioning protrusion 711 provided on the lower-side unit case 700. Finally, the second positioning hole 512 provided on the projection unit 500 is put in a state of being engaged with the third positioning protrusion 712 provided on the lower-side unit case 700.

After the projection unit 500 has been put in a state of being engaged with the lower-side unit case 700, the projection unit 500 is then fixed on the lower-side unit case 700 by tightening a fix screw 713.

Figure 9:
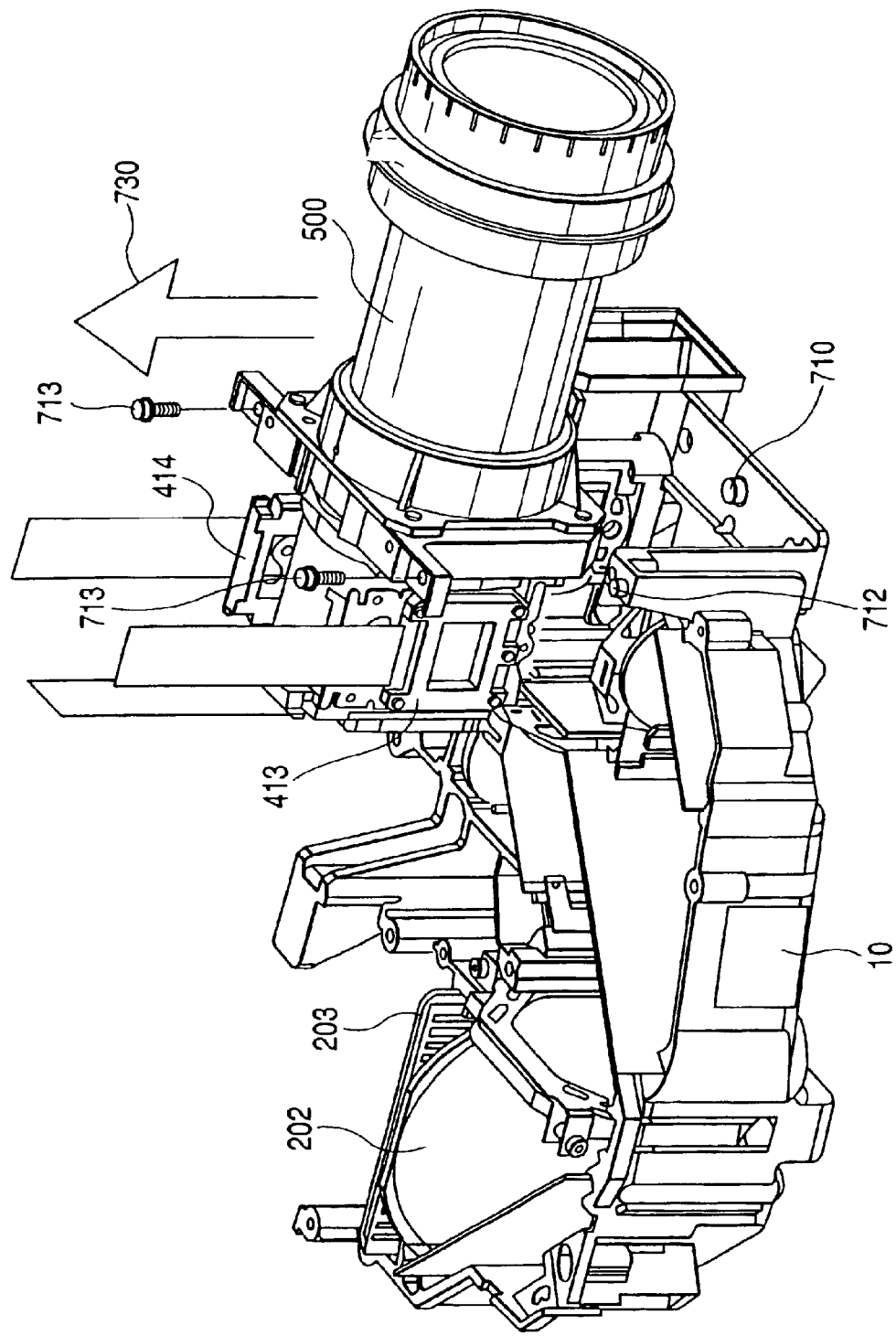
FIG. 9 is an explanatory diagram used for describing attachment and detachment of a projection means to and from the picture display apparatus implemented by the first embodiment of the present invention.

FIG. 9 is a diagram showing a squint view of the attachment/detachment state of the projection unit 500 of FIG. 1 seen from a different angle. The projection unit 500 can be directly attached to and detached from the lower-side unit case 700. That is, the projection unit 500 including the light valve means can be attached to and detached from the lower-side unit case 700 so that preventive maintenance work such as cleaning the light valve means can be done without removing other components such as the upper-side unit.

If a direction to remove the projection unit 500 indicated by an arrow 730 is oriented to match a setting direction of the gate quantity of the projection lens, the removal distance can be shortened so that the projection unit 500 can be removed with ease.

Figure 10:
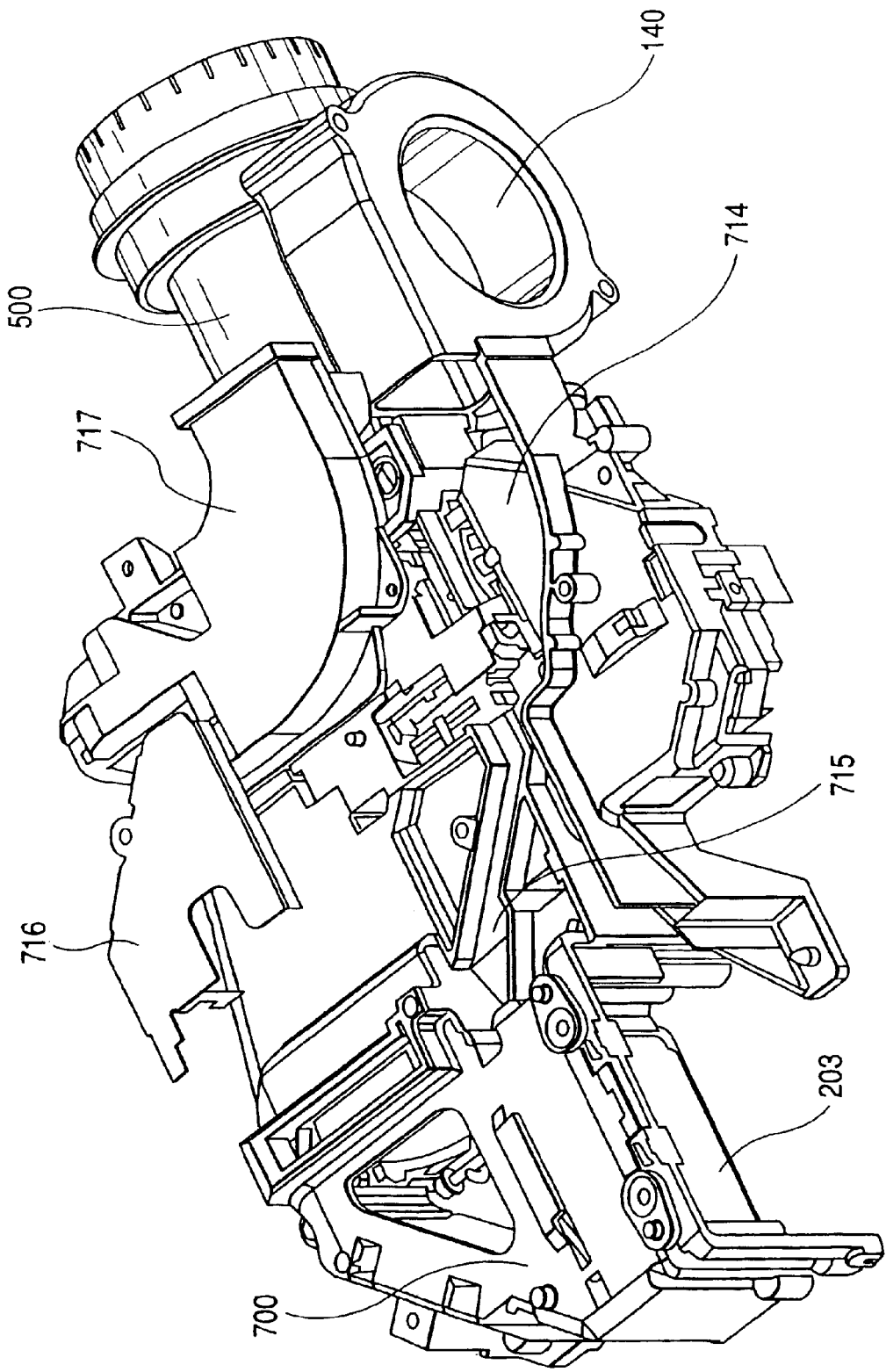
FIG. 10 is a diagram showing a squint view of a cooling duct employed in the picture display apparatus implemented by the first embodiment of the present invention.
Figure 11:
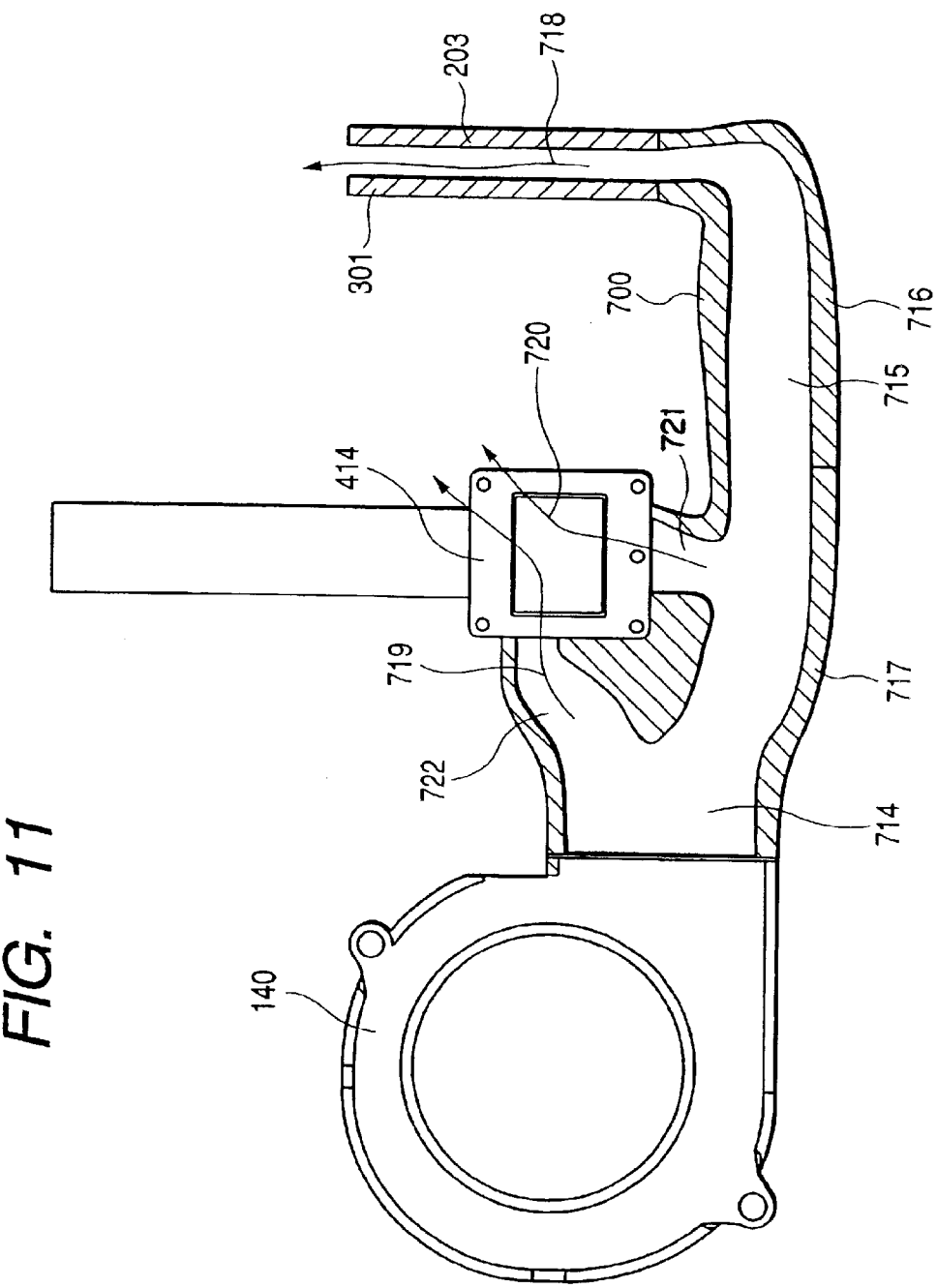
FIG. 11 is a diagram showing a cross section of the configuration of a cooling system in the picture display apparatus implemented by the first embodiment of the present invention.

FIG. 10 is a diagram showing a squint view of details of a cooling system. FIG. 11 is a diagram showing details of connection of a duct employed in the cooling system shown in FIG. 10.

A duct serving as a wind guiding unit 714 is provided on the lower-side unit case 700 employed in the optical unit 10. As shown in FIG. 11, the wind guiding unit 714 serves as a wind guiding path in conjunction with a guide member 717 provided separately. A wind output by a centrifugal fan 140 blows to components including the light valve means through this wind guiding path. At the ends of the wind guiding path comprising the wind guiding unit 714 and the guide member 717, there are branch portions at which the wind guiding unit 714 is split into a second wind guiding unit 715 and 2 other branch wind guiding paths going to the light valve means 414. A first cooling wind 719 flows through a side supply opening 722 to cool the light valve means 413, 414 and 415, and a second cooling wind 720 flows through a bottom supply opening 721 to cool the light valve means 413, 414 and 415. A wind guiding plate 716 is provided for the second wind guiding unit 715. The wind guiding plate 716 and the second wind guiding unit 715 are 2 members constituting another wind guiding path or a third branch wind path. At the end of the this third branch wind guiding path, there is a space 718 between the first collimator 301 and the second integrator lens 203. The duct serving as the second guiding unit 715 is connected to the space 718. In this configuration, when the centrifugal tan 140 is rotating, a wind blown by the centrifugal fan 140 is split at the branch portions of the wind guiding path comprising the wind guiding unit 714 and the guide member 717, going to the 2 branch wind guiding paths toward the light valve means 414 and the B branching wind guiding unit 715 serving as the third branch wind guiding path. The wind going to the second branching wind guiding unit 715 serving as the third branch wind guiding path further blows forward to the space 718 between the first collimator 301 and the second integrator lens 203, cooling the first collimator 301 and the second integrator lens 203 which serve as optically functioning parts. The wind then enters the outside of the optical unit 10.

In this way, it is possible to cool not only the light valve means and its peripheral parts, but also the optically functioning parts.

Figure 12:
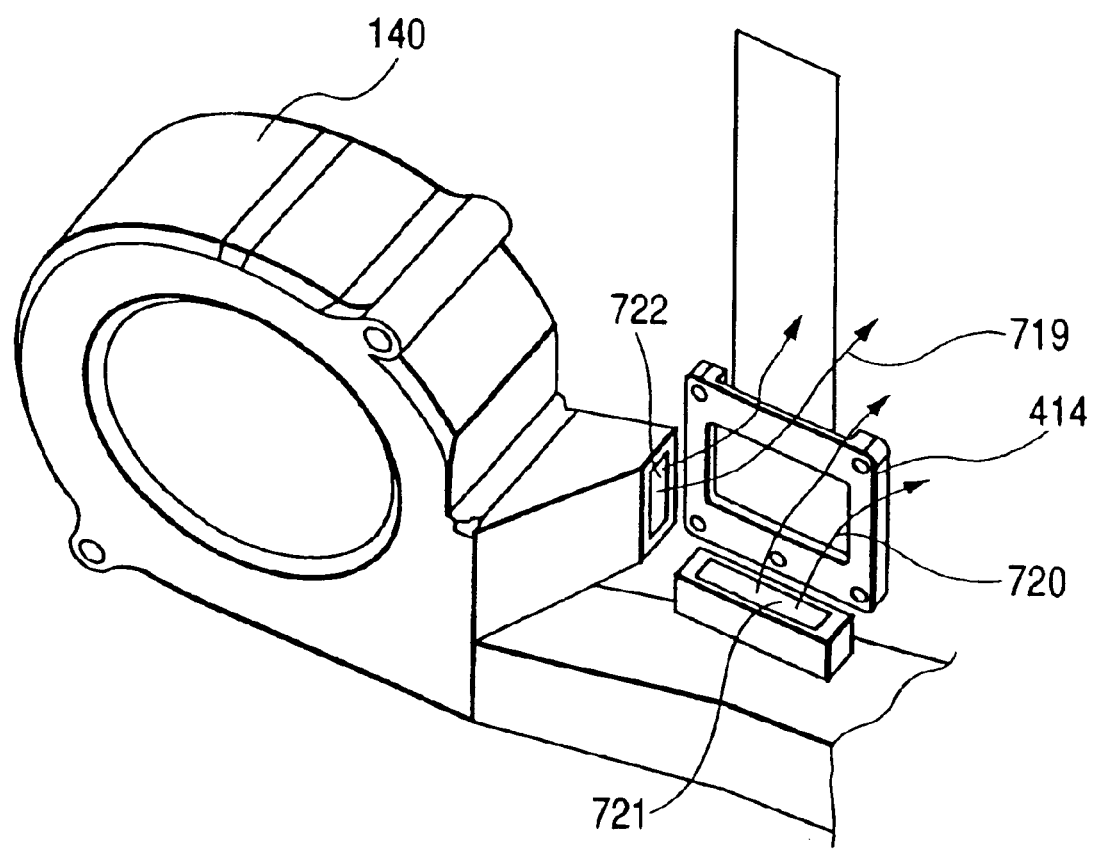
FIG. 12 is a diagram showing the configuration of a cooling system in the picture display apparatus implemented by a second embodiment of the present invention.

FIG. 12 is an explanatory diagram showing directions of cooling winds around the light valve means. As shown in this figure, a wind blown by the centrifugal fan 140 is split at the branch portions to ducts (wind guiding paths), some of which end at a side supply opening 722 and a bottom supply opening 721 which both face the light valve means 414 and are oriented in directions almost perpendicular to each other as shown in FIG. 12. The winds are thus blown through a plurality of supply openings in directions within the range 45 to 315 degrees. By blowing 2 winds in different directions in this way, at about the center of the light valve means 414, the flows of winds form a turbulent flow, increasing the heat-transfer efficiency and making effective cooling possible. That is, a turbulent flow is formed forcibly to increase the cooling efficiency. In this way, the cooling power can be enhanced without increasing the wind blowing capacity in particular.

That is, a turbulent flow is formed forcibly to increase the cooling efficiency. In this way, the cooling power can be enhanced without increasing the wind blowing capacity in particular.

The flows of airs are explained with reference to FIG. 12 by taking a light valve means as an example. In actuality, however, polarization means are provided on the upstream and downstream sides of the light valve means in many cases. Much like a light valve means, a polarization means is also an optically functioning part that dissipates heat, hence, requiring cooling. It is needless to say that a polarization means provided at the location of the light valve means shown in FIG. 12 can be cooled in the same way. In addition, with polarization means provided on the upstream and downstream sides of the light valve means, the polarization means and the light valve means can also be cooled simultaneously in the same way as well.

In a word, the first embodiment of the present invention is capable of providing a solution to the problem of a rising amount of heat dissipated by optically functioning components accompanying an increase in luminance. The embodiment has an effect of effectively solving the problem by blowing cooling winds to the light valve means at a plurality of different angles to increase the heat-transfer efficiency and applying the same cooling means as the light valve means to optically functioning components other than the light valve means to cool those components. As for the maintainability of the light valve means and components in close proximity to the light valve means, the picture display apparatus is designed into a configuration wherein the projection unit can be attached to and detached from the optical unit. The embodiment also allows the projection unit to be attached and detached from the optical unit by attaching and detaching the projection unit to and from the optical unit in a direction coinciding the direction of the gate quantity of the projection lens, hence, exhibiting an effect of excellent maintainability.

Figure 13:
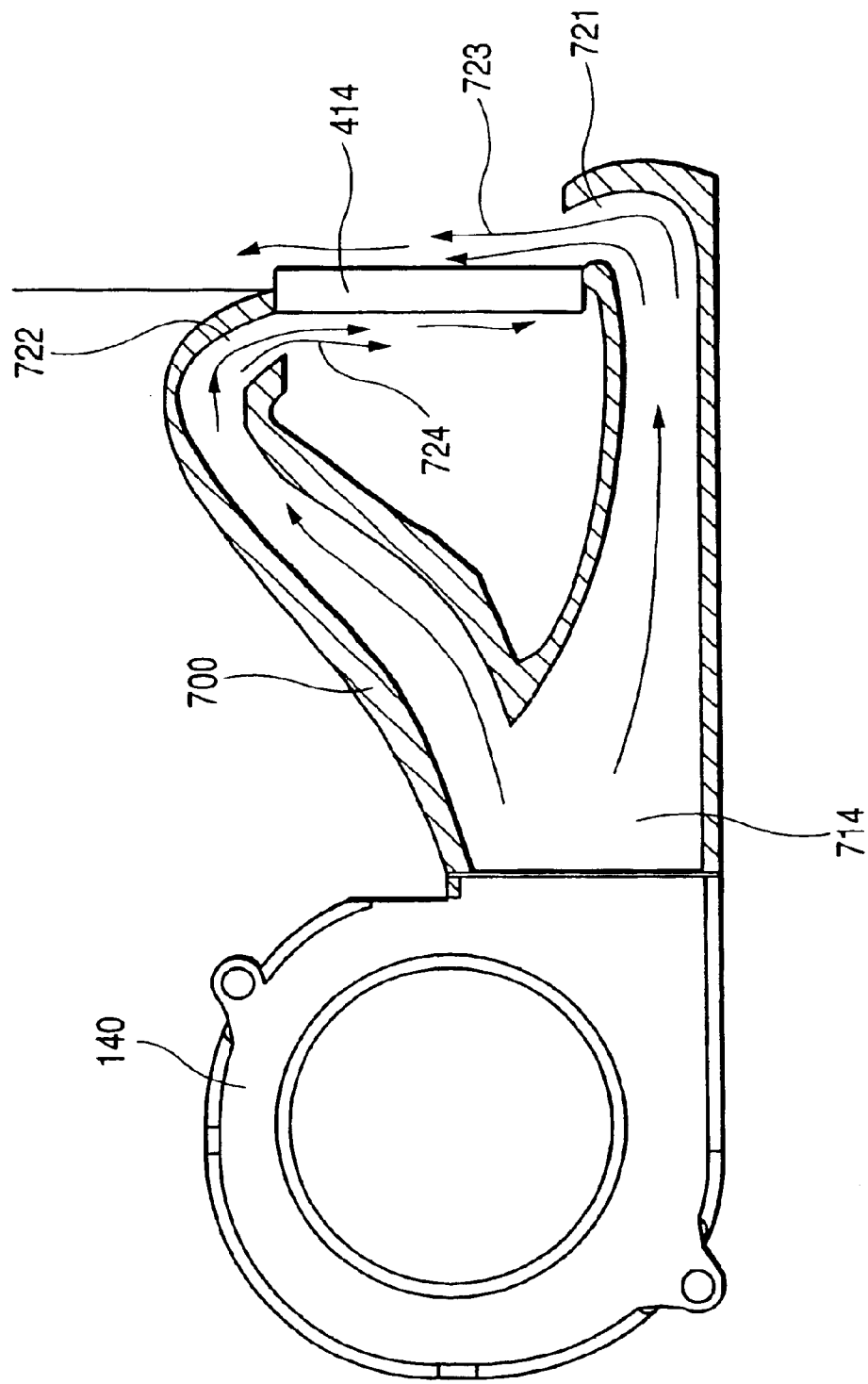
FIG. 13 is a diagram showing the configuration of a cooling system in the picture display apparatus implemented by a third embodiment of the present invention.

FIG. 13 is a diagram showing a squint view of cooling by a second embodiment of the present invention. As shown in the figure, the light valve means 414 and components in close proximity to the light valve means 414 are cooled by blowing winds over the back surface or the surface of incidence and the front surface or the surface of emission of the light valve means 414 in directions opposite to each other. To put it in detail, a blowing direction 724 of a supply opening 722 on the surface of incidence is opposite to a blowing direction 723 of a supply opening 721 on the surface of emission. In this way, the temperature gradients of the light valve means can be averaged unlike the conventional technique of cooling the light valve means whereby a wind is blown in only one direction so that the temperature on the incidence side of the wind is low while the temperature on the emission side of the wind is relatively high. In addition, since the temperature gradients can be averaged, the highest temperature in the light valve means in question can be suppressed and, as a result, the cooling efficiency is increased. According to the second embodiment of the present invention, there is exhibited an effect of an improved cooling efficiency of the light valve means and components in close proximity to the light valve means.

Figure 14:
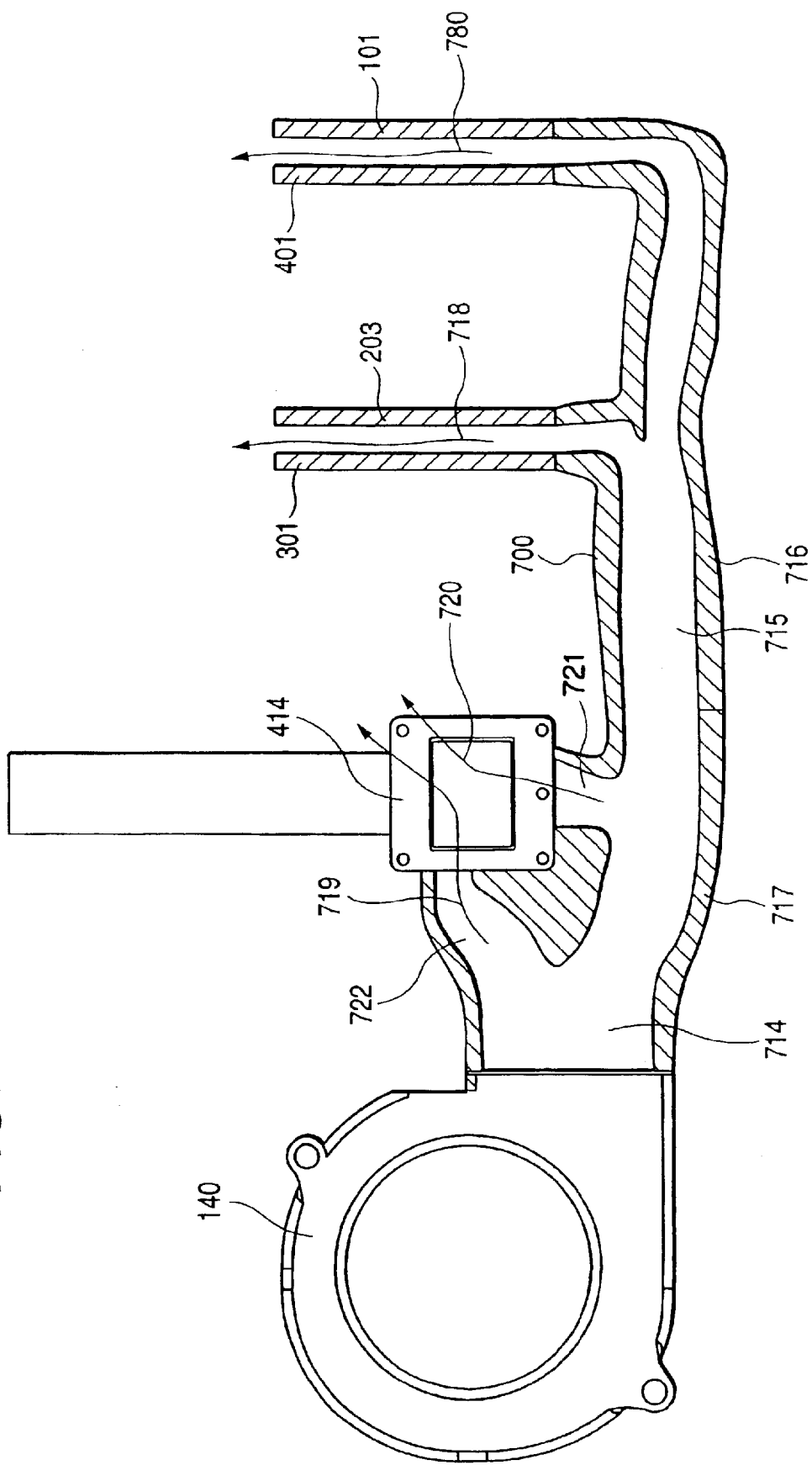
FIG. 14 is a diagram showing the configuration of a cooling system in the picture display apparatus implemented by a fourth embodiment of the present invention.

FIG. 14 is a diagram showing branching of ducts in a third embodiment of the present invention.

As shown in FIG. 14, a wind blown by the centrifugal fan 0 is split at a wind guiding path 714 into a wind going to the light valve means 414 and a wind proceeding through a wind guiding path 715. The wind proceeding through the wind guiding path 715 is further split at a branch portion into a wind going to a space 718 between the first collimator 301 and the second integrator lens 203, and a wind proceeding to a space 780 between the light source 101 and the first integrator lens 401. The wind that further blows forward to the space 718 between the first collimator 301 and the second integrator lens 203 cools the first collimator 301 and the second integrator lens 203 which serve as optically functioning parts. On the other hand, the wind proceeding to a space 780 between the light source 101 and the first integrator lens 401 cools the surface of emission of the light source 101 and the first integrator lens 401. After the cooling, the winds are exhausted to the outside of the optical unit. According to the third embodiment of the present invention, there is exhibited an effect of a capability of efficiently cooling a plurality of optically-functioning-component pairs that need to be cooled.

Figure 15:
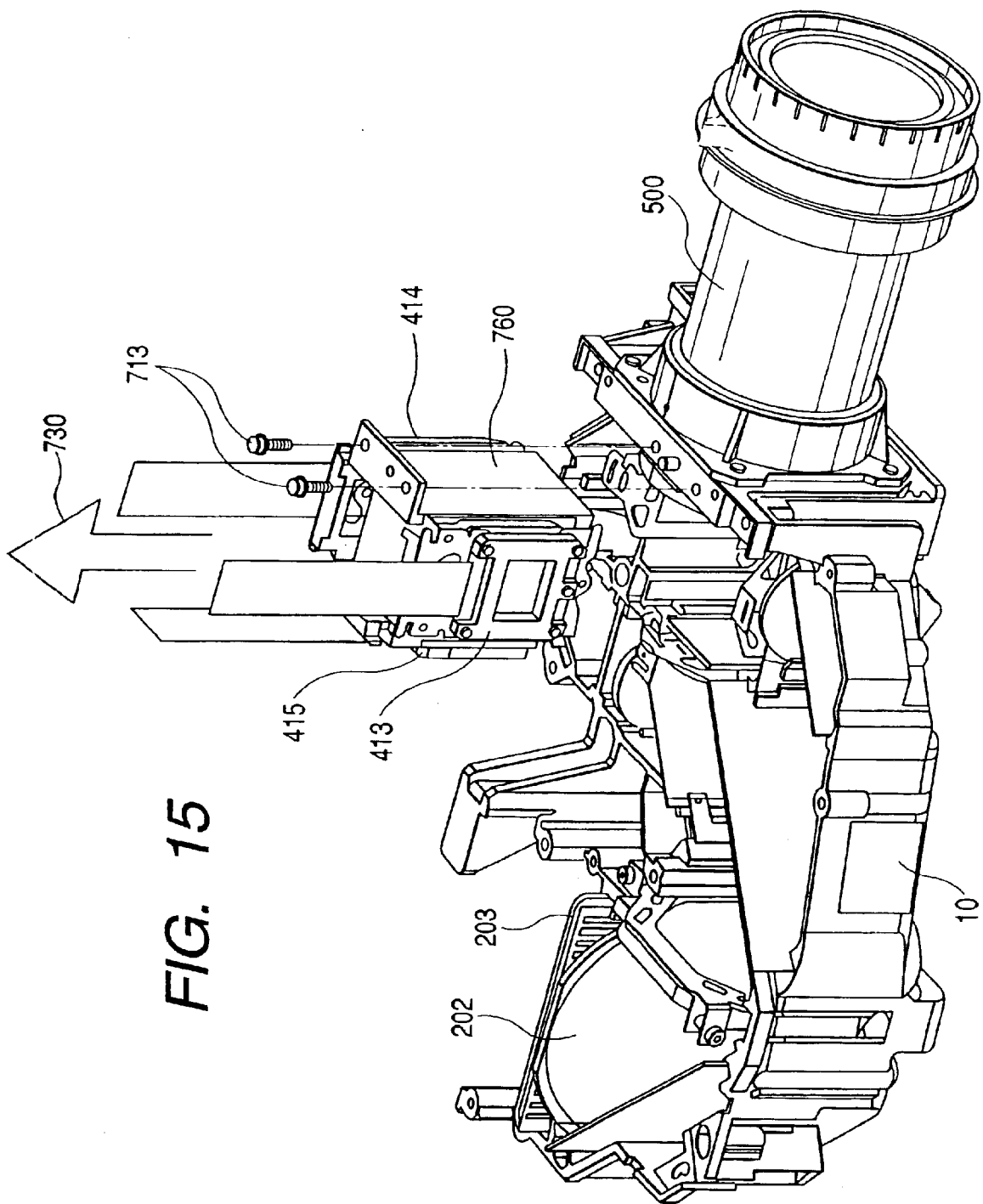
FIG. 15 is an explanatory diagram used for describing attachment and detachment of a projection means to and from the picture display apparatus implemented by a fifth embodiment of the present invention.

FIG. 15 is a diagram showing a squint view of a fourth embodiment of the present invention.

In the configuration of the fourth embodiment, the light valve means 413, 414 and 415 and a prism unit 760 serving as a color synthesizing means are assembled to form a single body which can be attached to and detached from the optical unit.

With such the configuration according to the fourth embodiment of the present invention, there is exhibited an effect of easy maintenance such as cleaning to solve problems caused by, among other things, sticking of dust to the light valve means as described above.

The present invention has been exemplified by embodiments employing liquid crystals as light valve means. It should be noted that another light valve means of the transmission or reflection type such as a infinitesimal mirror array system or the laser address liquid-crystal system can also be used in the same way as long as the other light valve means is capable of modulating an incident light and projected the modulated light as a picture. In addition, the present invention has been exemplified by the so-called 3-plate system wherein 3 light valve means 413, 414 and 415 are employed. It is needless to say, however, that the same effects can be exhibited for a system employing only 1 or 2 light valve means.

In the system implemented by the embodiments described above, a picture is projected on a screen from a position in front of the screen. It is worth noting that the scope of the present invention is not limited to such embodiments. For example, the present invention can also be applied to a picture display apparatus of the so-called back-surface projection type wherein a picture is projected on a screen from a position behind the screen.

In addition, while the picture display apparatus has been exemplified by a portable compact apparatus, it is needless to say that the same effects can be obtained for an apparatus of any other type such as a fixed apparatus permanently installed at a place like a theater or an outdoor apparatus installed outside a building as part of the building.

In a word, the present invention provides a picture display apparatus for radiating a light emitted by a light source to a light valve means for modulating the light and projecting the modulated light on a screen as a picture, wherein the light valve means is cooled by blowing winds to the light valve means at a plurality of different angles to create a turbulent flow so as to increase the cooling efficiency. As for the cooling of optically functioning components other than the light valve means, a cooling wind is split at a branch portion of a duct to provide a configuration in which the optically functioning components other than the light valve means and the light valve means itself can be cooled at the same time.

In addition, the picture display apparatus is designed into a configuration wherein a projection means can be detached from the optical unit in the upward direction and an installation base common to the projection means and the optical unit is adopted to avoid a problem of a shift in optical position accompanying an attachment or a detachment of the projection unit to and from the optical unit. Furthermore, in an attachment or a detachment of the projection unit to and from the optical unit, the projection means alone can be attached to or detached from the optical unit with ease without the necessity to disassemble the optical unit.

As described above, the light valve means can be cooled with a high degree of efficiency by virtue of a turbulent flow of cooling winds. In addition, it is possible to use the cooling means for cooling the light valve means also for cooling other optically functioning components which need cooling as the luminance is increased. Moreover, since the projection means can be attached to or detached from the optical unit with ease, the maintenance work is made simple.

As described above, according to the present invention, it is possible to cool light valve means, components in close proximity thereto and other optically functioning components as well as to remove dust from the light valve means.

The present invention can be implemented by modified versions of the embodiments described above without deviating from the spirit and principal characteristics of the invention. Thus, the embodiments described above are no more than just preferred examples to implement the present invention in several aspects and, thus, are not intended to limit the scope of the invention. The scope of the present invention is defined by the range of claims appended at the end of this specification. It is therefore contemplated that the appended claims will cover any such modified versions of the embodiments as they fall within the true scope of the present invention.

What is claimed is:

1. A projective display apparatus comprising:
   an illumination unit which includes a light source, an integrator lens and a collimator lens;
   a light splitter unit which splits light beams from said illumination unit into a plurality of color components;
   a plurality of light valves, a respective one of said plurality of light valves corresponding to a respective one of said plurality of color components;
   a cooling fan; and
   a wind guiding unit which guides the cooling wind from said cooling fan to said illumination unit and said plurality of light valves;
   wherein said wind guiding unit splits and forms at least two branch wind guiding paths, one of said at least two branch wind guiding paths guiding cooling wind from said cooling fan to said illumination unit and another of said at least two branch guiding paths guiding said cooling wind to said plurality of light valves.

2. A projective display apparatus as defined in claim 1, wherein said cooling fan is a centrifugal fan.

3. A projective display apparatus as defined in claim 1, wherein said wind guiding unit extends to a lower part of said plurality of light valves, and said cooling fan blows said cooling wind from said lower part forward to an upper part of said plurality of light valves.

4. A projective display apparatus as defined in claim 1, wherein said wind guiding unit guides said cooling wind from said cooling fan to said light source, said integrator lens, said collimator lens and said plurality of light valves for cooling thereof.

* * * * *